(12) United States Patent
Li et al.

(10) Patent No.: US 10,876,693 B2
(45) Date of Patent: Dec. 29, 2020

(54) DOWNLIGHT APPARATUS

(71) Applicant: LEEDARSON LIGHTING CO. LTD., Fujian (CN)

(72) Inventors: Ke Li, Fujian (CN); Xiaoliang Wen, Fujian (CN); Zhangming Liu, Fujian (CN); Maojin Zeng, Fujian (CN)

(73) Assignee: LEEDARSON LIGHTING CO. LTD., Fujian (CN)

( * ) Notice: Subject to any disclaimer, the term of this patent is extended or adjusted under 35 U.S.C. 154(b) by 181 days.

(21) Appl. No.: 15/944,611

(22) Filed: Apr. 3, 2018

(65) Prior Publication Data

US 2019/0120448 A1   Apr. 25, 2019

(30) Foreign Application Priority Data

Oct. 24, 2017   (CN) ..................... 2017 2 1381316 U

(51) Int. Cl.
| | | |
|---|---|---|
| F21S 8/02 | (2006.01) |
| F21V 21/04 | (2006.01) |
| F21V 3/06 | (2018.01) |
| F21V 29/70 | (2015.01) |
| G02B 6/00 | (2006.01) |
| F21V 13/04 | (2006.01) |
| F21Y 115/10 | (2016.01) |
| F21V 23/02 | (2006.01) |
| F21Y 103/33 | (2016.01) |

(52) U.S. Cl.
CPC ............ F21S 8/026 (2013.01); F21V 3/0625 (2018.02); F21V 13/04 (2013.01); F21V 21/04 (2013.01); F21V 29/70 (2015.01); G02B 6/00 (2013.01); F21V 21/046 (2013.01); F21V 23/02 (2013.01); F21Y 2103/33 (2016.08); F21Y 2115/10 (2016.08)

(58) Field of Classification Search
CPC . F21S 8/026; F21V 21/04; G02B 6/00; G02B 6/0045; F21Y 2103/33
See application file for complete search history.

(56) References Cited

U.S. PATENT DOCUMENTS

| | | | | |
|---|---|---|---|---|
| 9,791,111 B1* | 10/2017 | Huang | ...................... | F21K 9/20 |
| 2010/0165013 A1* | 7/2010 | Yamamoto | ........... | G09G 3/3413 |
| | | | | 345/692 |
| 2011/0249445 A1* | 10/2011 | Vasta | .................... | F21V 7/0025 |
| | | | | 362/296.08 |
| 2013/0265750 A1* | 10/2013 | Pickard | ................. | F21V 21/088 |
| | | | | 362/184 |
| 2014/0254154 A1* | 9/2014 | Catalano | ................. | F21V 13/04 |
| | | | | 362/243 |

(Continued)

*Primary Examiner* — Evan P Dzierzynski
(74) *Attorney, Agent, or Firm* — Chun-Ming Shih; Lanway IPR Services

(57) ABSTRACT

A downlight apparatus has a main cup housing, a driver circuit, a first LED set, a second LED set and a light guide cup. The driver circuit is contained in the main cup housing for converting an external power to a driving current. The first LED generates a central luminous effect. The light guide cup has a top part and a bottom part. A light output pattern is formed on internal surface of the light guide cup between the top part and the bottom part. The top part receives a light of the second LED set. The light enters the light guide cup and escapes from the light output pattern.

18 Claims, 7 Drawing Sheets

(56) References Cited

U.S. PATENT DOCUMENTS

| | | | |
|---|---|---|---|
| 2015/0168633 A1* | 6/2015 | Gantenbrink | F21V 13/10 362/308 |
| 2016/0047530 A1* | 2/2016 | Rodriguez | G02B 19/0023 362/297 |

* cited by examiner

US 10,876,693 B2

DOWNLIGHT APPARATUS

FIELD OF INVENTION

The present invention relates to a light apparatus and more particularly related to a downlight apparatus.

BACKGROUND

Most of the current downlights are provided with LED (Light-emitting diode) light sources. Compared with traditional downlights, LED downlights are superior in energy efficient, environmentally friendly, long lifetime, etc.

However, LED light sources also have some problem like directional characteristics which may cause visual glare and uniformity of illuminance. Some downlight devices therefore have reflectors and anti-glare structures to improve the overall luminance effect. But, it is worthy to continuously study and try finding ways to improve the downlight device design in this crowded art.

Any improvement on overall light effect may bring many benefits to human life because downlight devices are so widely used in today.

SUMMARY OF INVENTION

According to an embodiment of the present invention, a downlight apparatus has a main cup housing, a driver circuit, a first LED set, a second LED set and a light guide cup. The driver circuit is contained in the main cup housing for converting an external power to a driving current supplied to the first LED set and the second LED set. The first LED generates a central luminous effect. The light guide cup has a top part and a bottom part. A light output pattern is formed on internal surface of the light guide cup between the top part and the bottom part. The top part receives a light of the second LED set. The light enters the light guide cup and escapes from the light output pattern.

In some embodiments, the first LED set and the second LED set have different characteristics and are separated. For examples, the first LED set includes multiple LED modules to be mounted on a first plate, and the second LED set includes different LED modules to be mounted on a circular plate.

In such case, although the first LED set and the second LED set may be connected to the same driver circuit, but they may provide light of different optical characteristic, like luminous strength, color temperature, colors. In addition, the first LED set and the second LED set may be designed to be switched on and off respectively and independently. For example, users may turn on both the first LED set and the second LED set. Users may turn on the first LED set while turning off the second LED set. Users may turn off the first LED set but turn on the second LED set for providing a soft, less bright luminous environment.

In other words, such embodiment provides various interesting operation for multiple scenarios.

In some other embodiments, the second LED set are LED modules disposed on a peripheral area of a light source plate, and the first LED set are LED modules dispose in relative central area of the light source plate. In such case, the first LED set and the second LED set may also be operated independently, but in other cases, they may be controlled at the same to simply circuit design and cost. In such case, the second LED set are the same LED modules, just located at peripheral positions with respect to the first LED set.

In some embodiments, the overall luminous level of the first LED set is larger than the second LED set. For example, there are 20 LED modules in the firs LED set and 5 LED modules for the second LED set. Such configuration makes the central light of the first LED set as the major luminous source and the light of the second LED set as a decoration effect.

In some embodiments, the top part of the light guide cup has a cavity and the second LED set are disposed in the cavity. For example, the top part of the light guide cup may have a groove. The second LED set are mounted on a plate facing to the groove and LED modules of the second LED set are contained inside the cavity, e.g. a circular groove or multiple containing space.

The surface of the cavity helps guides light of the second LED set to desired directions. Therefore, certain lens structures may be disposed for various design needs.

In some embodiments, the cavity may be filled with transparent heat dissipation material for helping heat dissipation.

In some embodiments, the top part of the light guide cup has an optical component to distribute evenly the light of the second LED set into the light guide cup. For example, a diffusion guide may turn light of the second LED set from spot light sources into evenly distributed light source.

In some embodiments, a reflective layer covers at least part of or completely the external surface of the light guide cup. The reflective layer may be a heat sink with surface for reflecting light. The reflective layer may be painting material with reflective characteristic applied on the external surface of the light guide cup.

In some embodiments, the light output pattern is defined with inwardly groove on the internal surface of the light guide cup. In such case, the internal surface of the light guide cup may be smooth but has some inwardly concave structures like grooves. Light transmitting in the light guide cup escapes from theses grooves and form a light pattern. Please be noted that in addition to light output pattern, light may also escapes from other portion of the light guide cup. However, the light output pattern may appear a clearer visual pattern for human eyes.

In some other embodiments, the light output pattern is defined with outwardly protruding bars on the internal surface of the light guide cup.

In some embodiments, the light output pattern comprises multiple similar geometric shapes with different sizes with outer geometric shape surrounding the inner geometric shape. For example, the light output pattern includes multiple circles with different diameters and outer circles surround the inner circles.

In some other embodiments, the light output pattern is a spiral line.

In some other embodiments, the light output pattern comprises multiple discretely placed dots. In such case, when users look up to the downlight apparatus, they may see multiple stars shining from the internal surface of the light guide cup.

In some embodiments, the light output pattern includes multiple lines extended from the top part of the light guide cup to the bottom part of the light guide cup.

In some embodiments, the light guide cup has a larger thickness near the top part than near bottom part. For example, the light guide cup has different thickness from the top part to the bottom part, and the thickness is gradually decreased from the top part to the bottom part.

In some embodiments, the lateral side of the light guide cup from the top part to the bottom part forms a concave curve with respect to the center of the light guide cup.

In some other embodiments, the lateral side of the light guide cup from the top part to the bottom part forms a convex curve with respect to the center of the light guide cup.

In some embodiments, the bottom part of the light guide cup has a backside touching a ceiling where the downlight apparatus is installed. In other words, the light guide cup is used as the surface ring of the downlight apparatus that has an opening for output light and has a ring to attach to the ceiling.

In some embodiments, there is a first lens below the first LED set. The first lens may be made of a plurality of micro lens.

In some embodiments, the first lens and the light guide cup are made together as a one piece component. In other words, the one piece component may be made using plastic injection or other manufacturing process or material and the one piece component is easier to be installed and aligned to other components of the downlight apparatus.

DETAILED DESCRIPTION

In order to more clearly illustrate the technical problem to be solved by the present invention, the technical solutions and beneficial effects more apparent, the drawings and embodiments are briefly introduced below. It should be understood that the specific embodiments described here are only used to explain the present invention, cannot be construed as limiting of the present invention.

In the description of the present aspect, it is understood that the term "length", "width", "thickness", "upper", "lower", "front", "rear", "left", "right", "vertical", "horizontal", "top", "bottom", "inner", "outer", or the like indicating a positional relationship of the orientation shown in the accompanying drawings, for convenience of description only and the present invention is to simplify the description, but not indicate or imply that the device or element referred to must have a particular orientation, the orientation of a particular configuration and operation, cannot be construed as limiting of the present invention.

In the present invention, unless otherwise explicitly specified or limited, the term "installed", "connected", "fixed", "set" and like terms are to be broadly understood, for example, a fixed connection, the connection may be detachable or integrally; may be a mechanical connector may be electrically connected; may be directly connected, can also be connected indirectly through the intermediary, inside the communication may be two or two elements interaction between elements, unless otherwise specifically defined. Those of ordinary skill in the art, to be understood that the specific meanings in the present invention in accordance with specific circumstances.

Figure 1:
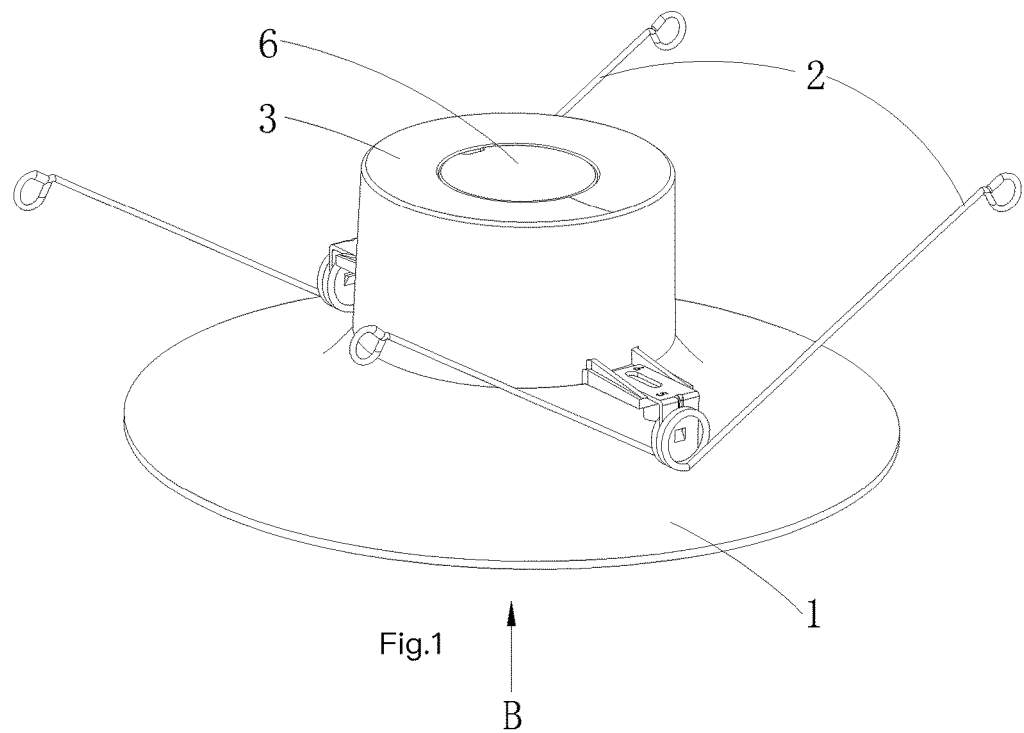
FIG. 1 is a downlight apparatus embodiment.

FIG. 1 illustrates a downlight apparatus example. In FIG. 1, the downlight apparatus has two springs 2 to fix the downlight apparatus in a cavity or an installation box in a ceiling. There is a main cup housing for storing drive circuit, a first LED set and a second LED set. The driver circuit provides power to the first LED set and the second LED set. The light of the second LED set is guided into a light guide cup and escapes from a output light pattern.

Please refer to FIG. 2 to FIG. 5. The light guide cup 1 includes the light guide cup body 11 and the compound lens structure. The light guide cup body 11 is a cup body made by transparent or translucent materials. The cup body may be frustum cone-shaped or other shaped. The diameter of the light-passing hole increases from top to bottom. The light guide cup 1 is regarded as a light guiding and light emitting component of downlight. Light enters from the upper end of the light-passing hole and leaves from grooves or protruding bars on internal surface of the light guide cup body 11.

The top surface of the light guide cup body 11 is provided with an annular groove for light incidence 113. Light entering the annular groove for light incidence 113 refracts, and then light passes from the light guide cup body 11 into the outside of the light guide cup 1. There are several annular grooves for light emitting 111 on the inner wall of the light guide cup body 11. Because the diameter of the light-passing hole increases from top to bottom, the diameter of annular groove for light emitting 111 increases from top to bottom as well.

A partial light entering the annular groove for light incidence 113 refracts and travels to outside, forming several circular halos. When users look up the light guide cup and the downlights of the present invention, the whole of light guide cup is lighted, and several circular halos of the downlights provide a unique and beautiful lighting effect, like the time tunnel.

The compound lens structure is a convex downward transparent curved wall. The compound lens structure covers the upper end of the light-passing hole 11. The compound lens structure is set in the light-passing hole 11 and connected to the upper end of the light-passing hole 11. The compound lens structure is a combination of regular small lens arrays. The compound lens structure efficiently diffuses light beams, increases the beam angle of light device and improves the uniformity of illuminance.

Light emitted from LED lighting component of the downlight enters the light guide cup 1 from upper end of the light-passing hole, and then the compound lens structure refracts the light; uniform diffusion effect of the compound lens structure makes the light uniform, soft without dazzling and increases the beam angle of the light. Light emitted from the compound lens structure enters the shell of the light guide cup body 11 or leaves from the lower end of the light-passing hole directly. Because the diameter of the light-passing hole increases smoothly from top to bottom (similar to a radiated shape), light refracted once or several times by the light guide cup body 11 get soft. Because of increasing diameter from top to bottom of the light-passing hole, the area of illumination is increased. After refraction occurs, the beam angle of refraction is more than a specific number without glaring; the area of illumination isn't too small.

Compared with the current technology, the light guide cup of the present invention has the light guide cup body, the compound lens structure and the light guide cup with the light-passing hole. The diameter of the light-passing hole increases from top to bottom. The light guide cup body is provided with an annular groove for light incidence and several annular grooves for light emitting. As a consequence, the light guide cup body can emit light when the downlight turns on; the beam angle of light is increased; the downlight provides a beautiful lighting effect.

Figure 2:
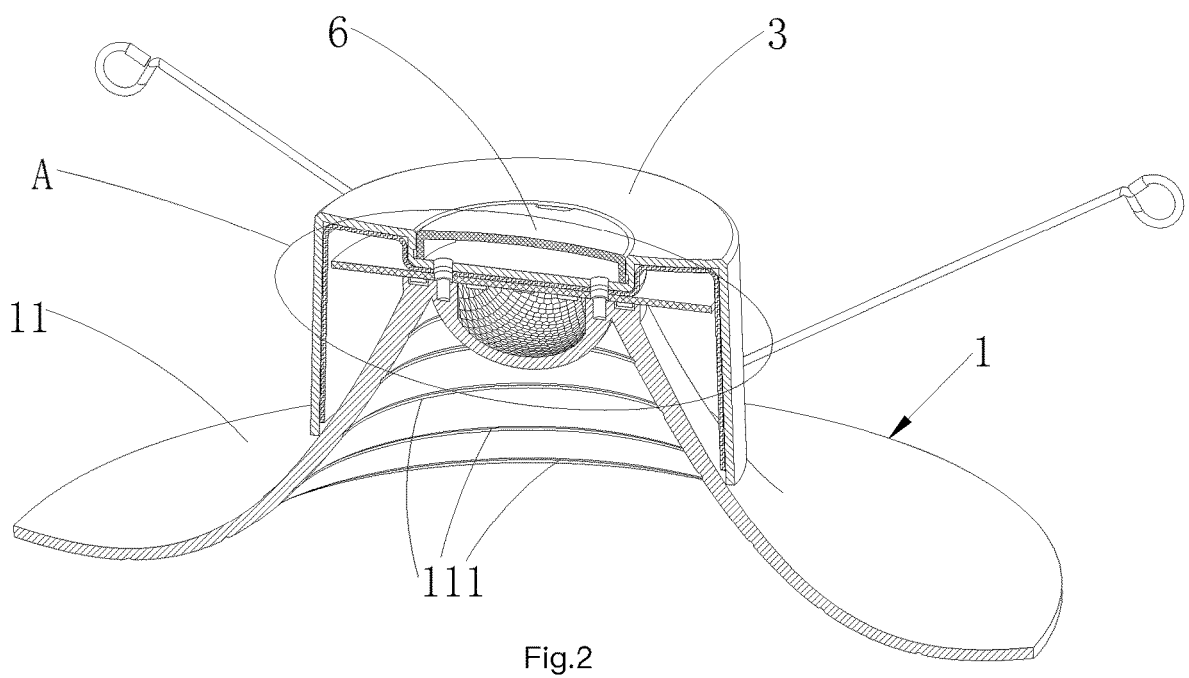
FIG. 2 is a fragmental perspective view of the downlight apparatus embodiment of FIG. 1.
Figure 3:
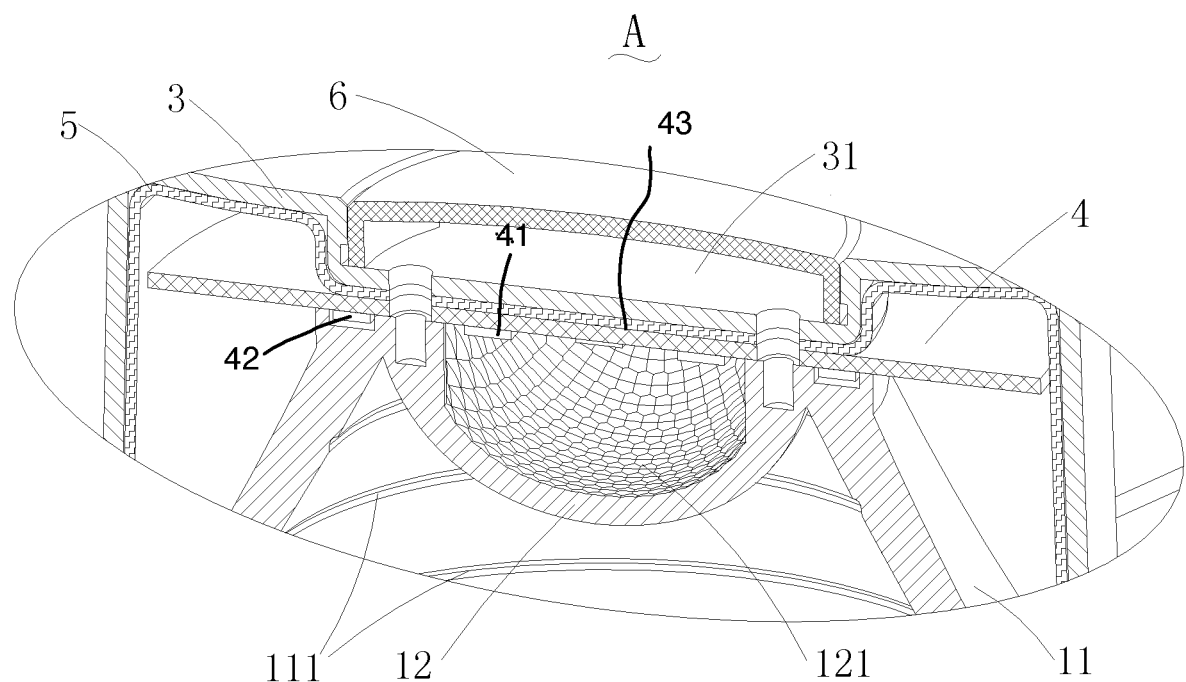
FIG. 3 is an enlarged fragmental perspective view of FIG. 3.
Figure 5:
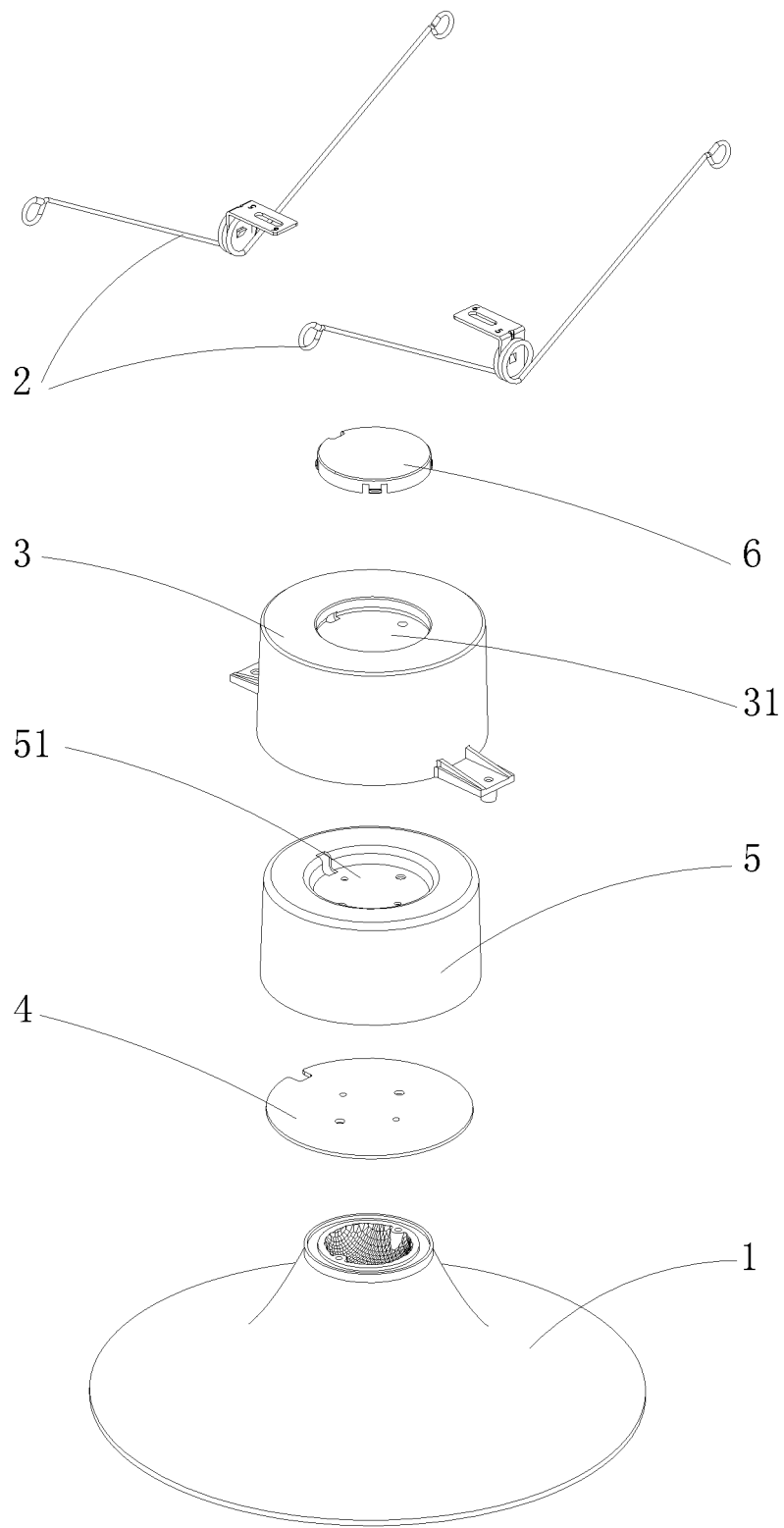
FIG. 5 is an exploded perspective view of a downlight of preferred embodiment of the present invention.
Figure 6:
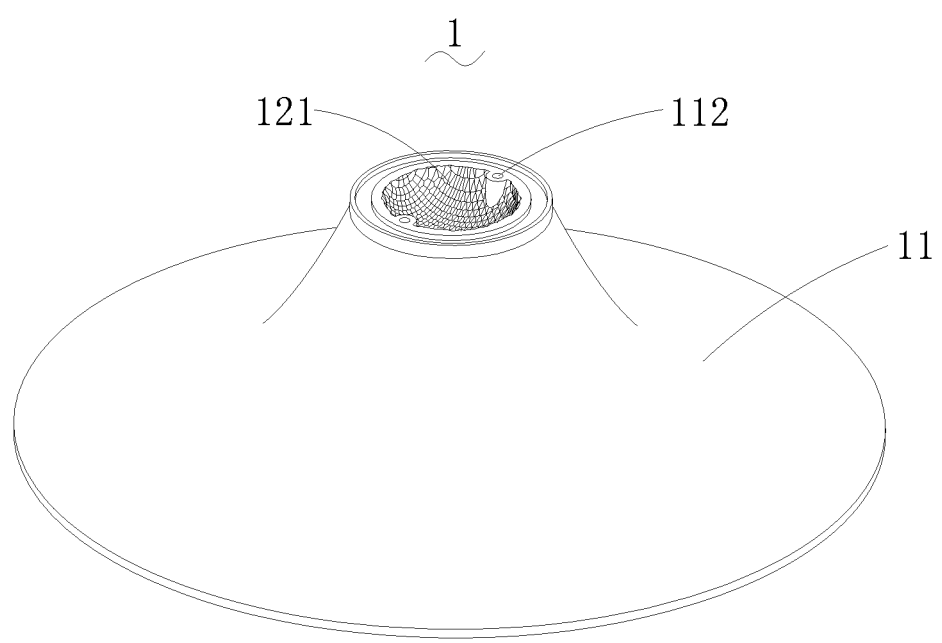
FIG. 6 is a perspective view of a light guide cup.

Furthermore, please refer to FIG. 2, FIG. 3 and FIG. 5. As one preferred embodiment of the present invention, the compound lens structure includes a convex downward transparent curved wall and lens arrays 121. The upper surface of the transparent curved wall is covered with the lens arrays 121. That is to say, the lens arrays 121 that the compound lens structure is composed of is set as the upper surface of the transparent curved wall. This type of the compound lens structure has lower production costs and easy production.

More specifically, the compound lens structure is integrally formed with the light guide cup body 11, which has lower production costs. In preferred embodiments, the transparent curved wall is a surface of revolution, and the axis of rotation of the transparent curved wall is equal to the axis of rotation of the light guide cup body 11.

Furthermore, please refer to FIG. 2, FIG. 3 and FIG. 5. As one preferred embodiment of the present invention, the light guide cup body 11 is a convex downward cup. The cross-sectional view of the light guide cup body 11 is similar to a bell curve. The appearances of the light guide cup body and the downlight are getting better, and the light guide cup body and the downlight provide a superior lighting effect.

Furthermore, please refer to FIG. 2. The thickness of the light guide cup body 11 decreases smoothly from top to bottom. Through this type of design, the optical effects of the light guide cup are increased; it is easy to integrally produce the light guide cup body; the material costs are reduced.

As one preferred embodiment of the present invention, the light guide cup body 11 is made by transparent material, such as glass, transparent PC (Polycarbonate), transparent PMMA (Polymethylmethacrylate), etc. The outer wall of the light guide cup body 11 is provided with a coating for light reflection. The coating allows the light entering the light-passing hole to be reflected at the light guide cup body 11, and it is rare that the light entering the light-passing hole is refracted at the light guide cup body 11.

Please refer to FIG. 1 to FIG. 6. The present invention provides a downlight. The downlight is composed of a light guide cup 1, an annular groove for light incidence 113, a LED lighting component 4 set in the light-passing hole, an insulating cover 3, at least one spring clip 2 connected to the insulating cover 3 and a heat dissipation cover 5. The heat dissipation cover 5 is covered with the insulating cover 3 and tightly attached to the insulating cover 3. The LED lighting component 4 is set in the heat dissipation cover 5. The LED lighting component 4 is connected to the heat dissipation cover 5. The downlight of the present invention is installed in the UL fuse holder by the spring clip 2.

Compared with the current technology, the downlight of the present invention has the light guide cup body, the compound lens structure and the light guide cup with the light-passing hole. The diameter of the light-passing hole increases from top to bottom. The light guide cup body is provided with an annular groove for light incidence and several annular grooves for light emitting. As a consequence, the light guide cup body can emit light when the downlight turns on; the beam angle of light is increased; the downlight provides a beautiful lighting effect, like the time tunnel.

Figure 4:
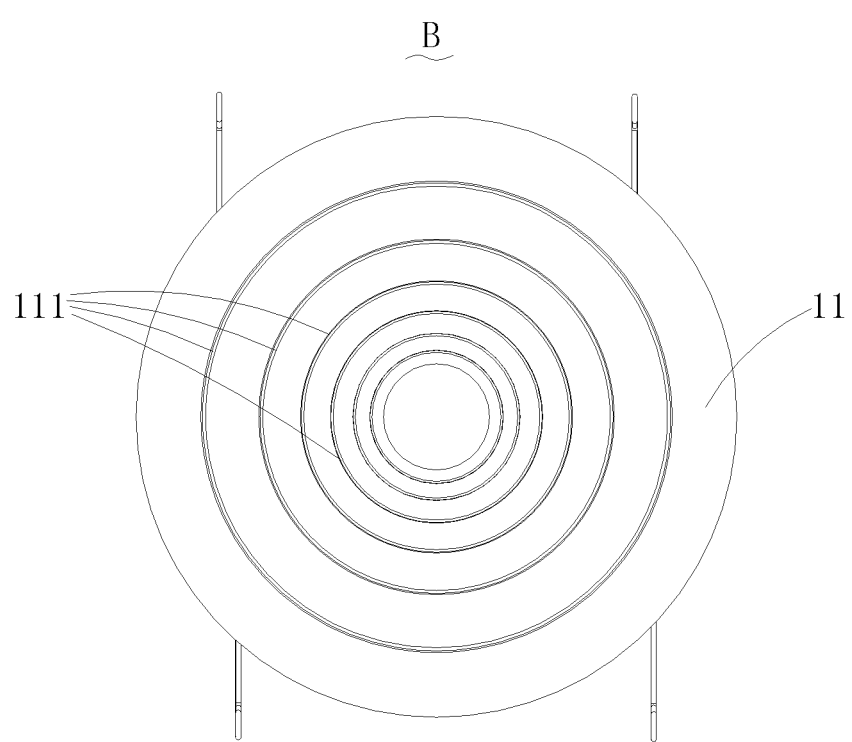
FIG. 4 is a perspective view from below of a downlight of FIG. 1.

Furthermore, please refer to FIG. 2 to FIG. 4. The LED lighting component 4 includes a lighting board 43, a driving component set on the lighting board, several 1st LED chips 41 and several 2nd LED chips. The driving component electrically connects to the 1st LED chips 41 and 2nd LED chips. The lighting board 43 connects to top surface of the light guide cup body 11. The 1st LED chips 41 are set on the lighting board 43 with circular arrangement and located at the annular groove for light incidence 113, which improve uniformity of illuminance. The 2nd LED chips are set on the lighting board 43. The 2nd LED chips are located at the light-passing hole. The structures of the 1st LED chips 41 and 2nd LED chips are the same. Both of the 1st LED chips 41 and 2nd LED chips are set on the lighting board 43. However, the 1st LED chips 41 are set with circular arrangement and located at the annular groove for light incidence 113, and light emitted from the 1st LED chips 41 enters the light guide cup body 11 directly. The 2nd LED chips are located at the light-passing hole, and light emitted from the 2nd LED chips enters the light-passing hole directly.

Furthermore, please refer to FIG. 2, FIG. 3, FIG. 5 and FIG. 6. The insulating cover 3, the heat dissipation cover 5, the LED lighting component 4 and the light guide cup 1 are provided with screw threads and connected through screw threads.

Furthermore, please refer to FIG. 2, FIG. 3, FIG. 4, FIG. 6. The downlight of the present invention further includes at least one screw fastener. The upper end of the light-passing hole is covered with the heat dissipation cover 5 and the insulating cover 3. The top of the heat dissipation cover 5 is provided with a 1st convex. The 1st convex is a downward convex and forming 1st space 51. The bottom wall of the first convex connects to the lighting board. The top of the insulating cover 3 is provided with a second convex. The 2nd convex is a downward convex and forming 2nd space 31. The second convex is located in the 1st space 51. The bottom wall of the 2nd convex connects to the bottom wall of the 1st convex. The top surface of the light guide cup body 11 is provided with at least one threaded hole 112. The threaded hole 112 corresponds to the screw fastener. Passing holes for the screw fastener are set on the bottom wall of the 1st convex, the bottom wall of the 2nd convex and the lighting board. The screw fastener passes through the passing hole, and is fixed to the threaded hole 112 by screw threads. As a result, the insulating cover 3, the heat dissipation cover 5, the LED lighting component 4 and the light guide cup 1 connect to each other. This type of connection is easy and stable.

Furthermore, please refer to FIG. 1, FIG. 2, FIG. 3 and FIG. 6. The downlight of the present invention further includes a decorating cover 6 set in the 2nd space 31. The decorating cover 6 connects to the insulating cover 3 by clips. The decorating cover 6 covers the screw threads connecting structure, and the downlight is getting more beautiful.

Please refer to FIG. 1, FIG. 2, FIG. 3 and FIG. 6. In preferred embodiments, the insulating cover 3, the heat dissipation cover 5 and the decorating cover are rotatory cylinder structures. The insulating cover 3, a cylindrical structure, includes a top wall and a side wall. The heat dissipation cover 5, a cylindrical structure, includes a top wall and a side wall. The 1st convex is set on the top wall of the heat dissipation cover. The 2nd convex is set on the top wall of the insulating cover.

Furthermore, please refer to FIG. 1 to FIG. 5. There are two spring clips 2 set on two sides of the side wall of insulating cover. More specifically, the spring clips 2 connect to the insulating cover 3 by steel angles. The side wall of the insulating cover is provided with two assembly holders prominent outward. The spring clips 2 are installed on the steel angles. The steel angles are fixed to the assembly holders by screw threads.

Figure 7:
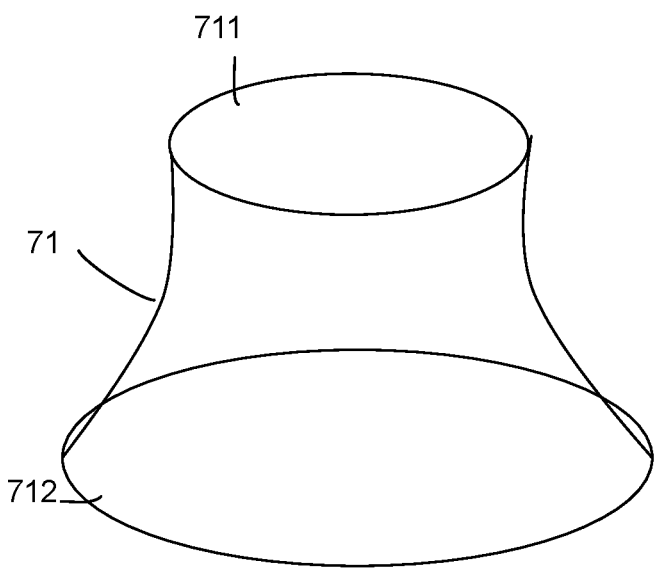
FIG. 7 illustrates a light guide cup structure.

Please refer to FIG. 7, which illustrates a light guide cup 71. The light guide cup 71 has a top part 711 and a bottom part. The lateral side of the light guide cup 71 from the top part 711 to the bottom part 712 forms a convex curve with respect to the center of the light guide cup.

Figure 8:
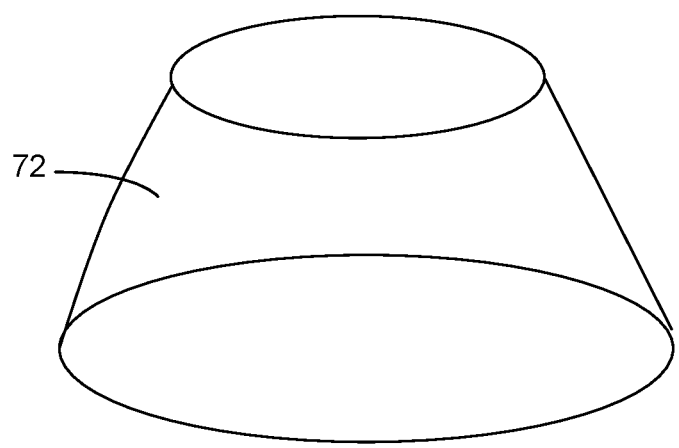
FIG. 8 illustrates another light guide cup structure.

Please refer to FIG. 8. FIG. 8 illustrates another light guide cup structure. In FIG. 8, the lateral side of the light guide cup 72 from the top part to the bottom part forms a line with respect to the center of the light guide cup 72.

Figure 9:
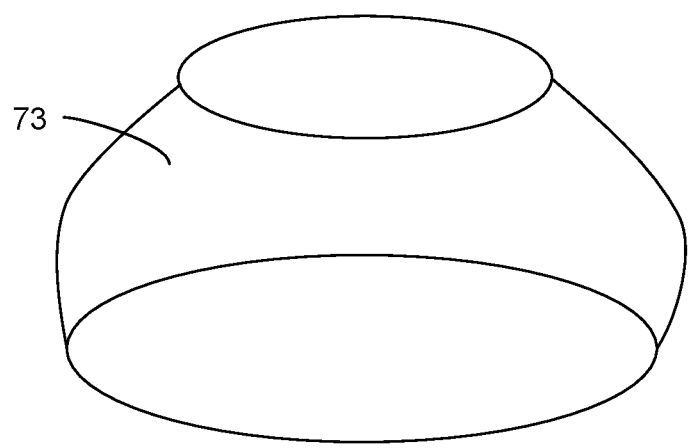
FIG. 9 illustrates yet another light guide cup structure.

Please refer to FIG. 9. FIG. 9 illustrates yet another light guide cup structure. In FIG. 9, the lateral side of the light guide cup 73 from the top part to the bottom part forms a concave curve with respect to the center of the light guide cup 73.

Figure 10:
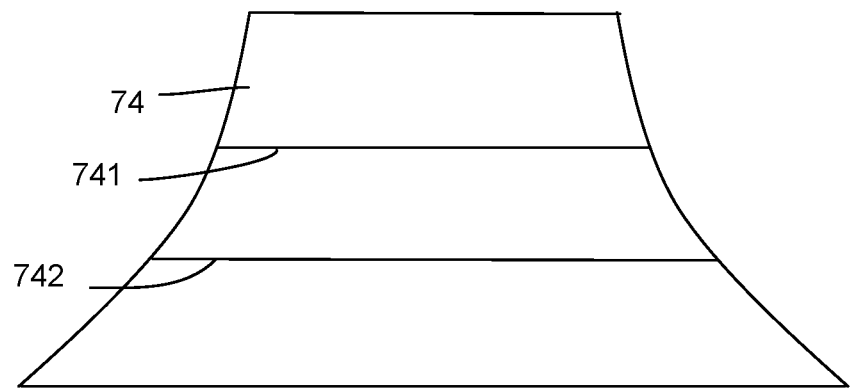
FIG. 10 illustrates a light output pattern example.

Please refer to FIG. 10. FIG. 10 illustrates a light output pattern example. In FIG. 10, there are multiple circles 741, 742 forming grooves in the internal surface of the light guide cup 74.

Figure 11:
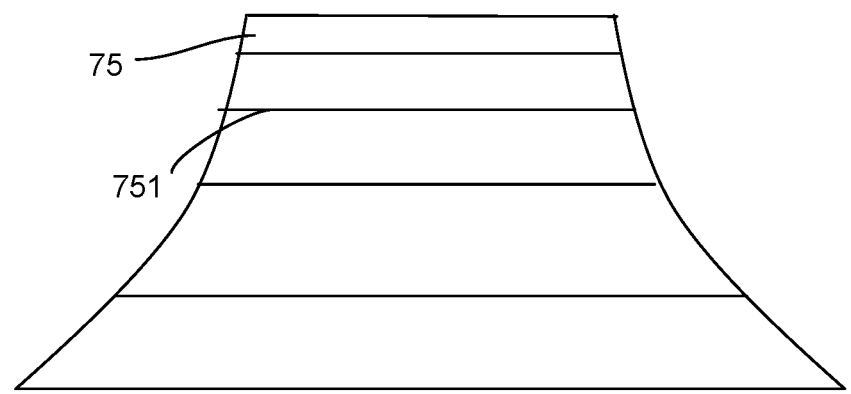
FIG. 11 illustrates another light output pattern example.

Please refer to FIG. 11. FIG. 11 illustrates another light output pattern example. In FIG. 11, unlike FIG. 10, the light output pattern has circles 751 with much more distribution density near the top part of the light guide cup 75. In other words, the circles of light output pattern are closer to each other than those near the bottom part of the light guide cup.

Figure 12:
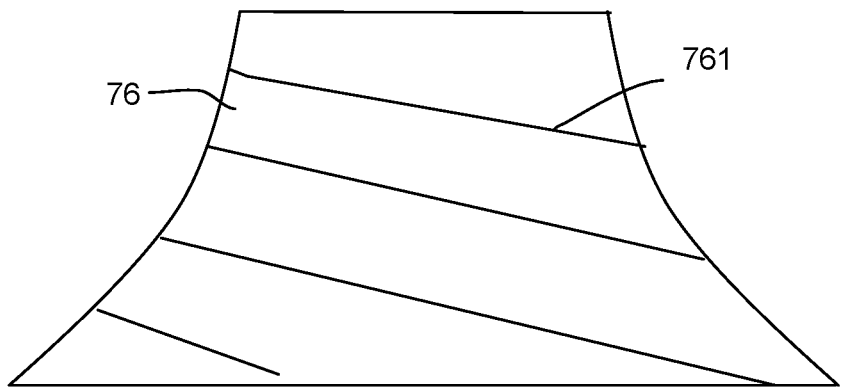
FIG. 12 illustrates another light output pattern example.

Please refer to FIG. 12. FIG. 12 illustrates another light output pattern example. In FIG. 12, the light output pattern 761 of the light guide cup 76 is one or more spiral lines.

Figure 13:
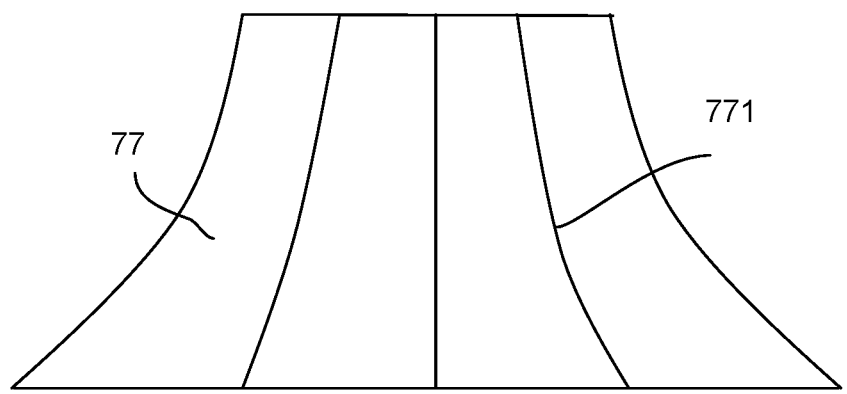
FIG. 13 illustrates another light output pattern example.

Please refer to FIG. 13. FIG. 13 illustrates another light output pattern example. In FIG. 13, the light output pattern 771 of the light guide cup 76 are lines extended from top part of the light guide cup 77 to the bottom part of the light guide cup 77.

According to an embodiment of the present invention, a downlight apparatus has a main cup housing, a driver circuit, a first LED set, a second LED set and a light guide cup. The driver circuit is contained in the main cup housing for converting an external power to a driving current supplied to the first LED set and the second LED set. The first LED generates a central luminous effect. The light guide cup has a top part and a bottom part. A light output pattern is formed on internal surface of the light guide cup between the top part and the bottom part. The top part receives a light of the second LED set. The light enters the light guide cup and escapes from the light output pattern.

In some embodiments, the first LED set and the second LED set have different characteristics and are separated. For examples, the first LED set includes multiple LED modules to be mounted on a first plate, and the second LED set includes different LED modules to be mounted on a circular plate.

In such case, although the first LED set and the second LED set may be connected to the same driver circuit, but they may provide light of different optical characteristic, like luminous strength, color temperature, colors. In addition, the first LED set and the second LED set may be designed to be switched on and off respectively and independently. For example, users may turn on both the first LED set and the second LED set. Users may turn on the first LED set while turning off the second LED set. Users may turn off the first LED set but turn on the second LED set for providing a soft, less bright luminous environment.

In other words, such embodiment provides various interesting operation for multiple scenarios.

In some other embodiments, the second LED set are LED modules disposed on a peripheral area of a light source plate, and the first LED set are LED modules dispose in relative central area of the light source plate. In such case, the first LED set and the second LED set may also be operated independently, but in other cases, they may be controlled at the same to simply circuit design and cost. In such case, the second LED set are the same LED modules, just located at peripheral positions with respect to the first LED set.

In some embodiments, the overall luminous level of the first LED set is larger than the second LED set. For example, there are 20 LED modules in the firs LED set and 5 LED modules for the second LED set. Such configuration makes the central light of the first LED set as the major luminous source and the light of the second LED set as a decoration effect.

In some embodiments, the top part of the light guide cup has a cavity and the second LED set are disposed in the cavity. For example, the top part of the light guide cup may have a groove. The second LED set are mounted on a plate facing to the groove and LED modules of the second LED set are contained inside the cavity, e.g. a circular groove or multiple containing space.

The surface of the cavity helps guides light of the second LED set to desired directions. Therefore, certain lens structures may be disposed for various design needs.

In some embodiments, the cavity may be filled with transparent heat dissipation material for helping heat dissipation.

In some embodiments, the top part of the light guide cup has an optical component to distribute evenly the light of the second LED set into the light guide cup. For example, a diffusion guide may turn light of the second LED set from spot light sources into evenly distributed light source.

In some embodiments, a reflective layer covers at least part of or completely the external surface of the light guide cup. The reflective layer may be a heat sink with surface for reflecting light. The reflective layer may be painting material with reflective characteristic applied on the external surface of the light guide cup.

In some embodiments, the light output pattern is defined with inwardly groove on the internal surface of the light guide cup. In such case, the internal surface of the light guide cup may be smooth but has some inwardly concave structures like grooves. Light transmitting in the light guide cup escapes from theses grooves and form a light pattern. Please be noted that in addition to light output pattern, light may also escapes from other portion of the light guide cup. However, the light output pattern may appear a clearer visual pattern for human eyes.

In some other embodiments, the light output pattern is defined with outwardly protruding bars on the internal surface of the light guide cup.

In some embodiments, the light output pattern comprises multiple similar geometric shapes with different sizes with outer geometric shape surrounding the inner geometric shape. For example, the light output pattern includes multiple circles with different diameters and outer circles surround the inner circles.

In some other embodiments, the light output pattern is a spiral line.

In some other embodiments, the light output pattern comprises multiple discretely placed dots. In such case, when users look up to the downlight apparatus, they may see multiple stars shining from the internal surface of the light guide cup.

In some embodiments, the light output pattern includes multiple lines extended from the top part of the light guide cup to the bottom part of the light guide cup.

In some embodiments, the light guide cup has a larger thickness near the top part than near bottom part. For example, the light guide cup has different thickness from the top part to the bottom part, and the thickness is gradually decreased from the top part to the bottom part.

In some embodiments, the lateral side of the light guide cup from the top part to the bottom part forms a concave curve with respect to the center of the light guide cup.

In some other embodiments, the lateral side of the light guide cup from the top part to the bottom part forms a convex curve with respect to the center of the light guide cup.

In some embodiments, the bottom part of the light guide cup has a backside touching a ceiling where the downlight apparatus is installed. In other words, the light guide cup is used as the surface ring of the downlight apparatus that has an opening for output light and has a ring to attach to the ceiling.

In some embodiments, there is a first lens below the first LED set. The first lens may be made of a plurality of micro lens.

In some embodiments, the first lens and the light guide cup are made together as a one piece component. In other words, the one piece component may be made using plastic injection or other manufacturing process or material and the one piece component is easier to be installed and aligned to other components of the downlight apparatus.

While the principles of this invention have been described in connection with specific embodiments, it should be understood clearly that these descriptions are made only by way of example and are not intended to limit the scope of the invention.

The invention claimed is:

1. A downlight apparatus, comprising:
a main cup housing;
a lighting board, contained in the main cup housing for converting an external power to a driving current;
first LED chips disposed on the lighting board for emtting a light entering a lens array of a compound lens structure;
second LED chips disposed on the lighting board; and
a light guide cup having a top part and a bottom part, a light output pattern formed on internal surface of the light guide cup between the top part and the bottom part, the top part receiving a light of the second LED chips, the light entering the light guide cup and escapes from the light output pattern.

2. The downlight apparatus of claim 1, wherein the second LED chips are LED modules disposed on a peripheral area of the lighting board, and the first LED chips are LED modules disposed in relative central area of the lighting board.

3. The downlight apparatus of claim 1, wherein the overall luminous level of the first LED chips is larger than the second LED chips.

4. The downlight apparatus of claim 1, wherein the top part of the light guide cup has a cavity and the second LED chips are disposed in the cavity.

5. The downlight apparatus of claim 1, wherein the top part of the light guide cup has an optical component to distribute evenly the light of the second LED chips into the light guide cup.

6. The downlight apparatus of claim 1, further comprising a reflective layer covering at least part of external surface of the light guide cup.

7. The downlight apparatus of claim 1, wherein the light output pattern comprises inwardly groove on the internal surface of the light guide cup.

8. The downlight apparatus of claim 1, wherein the light output pattern comprises outwardly protruding bars on the internal surface of the light guide cup.

9. The downlight apparatus of claim 1, wherein the light output pattern comprises multiple similar geometric shapes with different sizes with outer geometric shape surrounding the inner geometric shape.

10. The downlight apparatus of claim 1, wherein the light output pattern is a spiral line.

11. The downlight apparatus of claim 1, wherein the light output pattern comprises multiple discretely placed dots.

12. The downlight apparatus of claim 1, wherein the light output pattern comprises multiple lines extended from the top part of the light guide cup to the bottom part of the light guide cup.

13. The downlight apparatus of claim 1, wherein the light guide cup has a larger thickness near the top part than near bottom part.

14. The downlight apparatus of claim 1, wherein the lateral side of the light guide cup from the top part to the bottom part forms a concave curve with respect to the center of the light guide cup.

15. The downlight apparatus of claim 1, wherein the lateral side of the light guide cup from the top part to the bottom part forms a convex curve with respect to the center of the light guide cup.

16. The downlight apparatus of claim 1, wherein the bottom part of the light guide cup has a backside touching a ceiling where the downlight apparatus is installed.

17. The downlight apparatus of claim 1, wherein the lens array has a plurality of micro lens.

18. The downlight apparatus of claim 17, wherein the lens array and the light guide cup are made together as a one piece component.

* * * * *